United States Patent [19]

Koen

[11] B 3,981,599

[45] Sept. 21, 1976

[54] PUSH-PULL-LOCK DEVICE FOR SLIDE SHAFT

[75] Inventor: Toshiharu Koen, Yokohama, Japan

[73] Assignees: Victor Company of Japan, Limited; Nifco Inc., both of Tokyo, Japan

[22] Filed: Oct. 10, 1974

[21] Appl. No.: 513,789

[44] Published under the second Trial Voluntary Protest Program on February 3, 1976 as document No. B 513,789.

[30] Foreign Application Priority Data

Oct. 11, 1973 Japan .............................. 48-117446

[52] U.S. Cl. ................................ 403/107; 220/347; 220/345

[51] Int. Cl.[2] ......................... F16B 7/10; F16D 1/12

[58] Field of Search ........... 403/107, 104, 112, 324; 292/147; 52/254; 220/345, 346, 347; 206/236, 267, 540, 534.1, 534.2

[56] References Cited

UNITED STATES PATENTS

| | | | |
|---|---|---|---|
| 358,450 | 3/1887 | Hurlbut | 220/346 |
| 2,210,797 | 8/1940 | Crim | 403/107 X |
| 2,434,251 | 1/1948 | Warnke | 403/107 X |
| 2,708,026 | 5/1955 | Duell | 220/345 X |
| 3,537,422 | 11/1970 | Moe | 220/345 X |

*Primary Examiner*—Werner H. Schroeder
*Assistant Examiner*—Wayne L. Shedd
*Attorney, Agent, or Firm*—E. L. Beuno; R. W. Beart

[57] ABSTRACT

On a shaft fitting member, a plurality of hooked shaft guide pieces of an appropriately resilient plastic material are disposed alternately along the opposite edges of the shaft fitting member confrontingly at staggered positions. In the space formed inside the shaft guide pieces thus confrontingly disposed, there is inserted a plastic shaft having a raised strip with parallel edge faces each adapted to keep sliding contact with the horizontal face of the hooks of the shaft guide pieces on its side. One edge face of said raised strip is provided with one sawtooth projection permitting the shaft to slide only in the push direction and a plurality of trapezoidal projections permitting the shaft to be locked at any of as many selected positions. Owing to the construction described above, the shaft is permitted to slide in the push direction but, in its motion in the pull direction, it is allowed to slide over a fixed limited distance and is kept from being completely withdrawn from the guide pieces because of the sawtooth projection. The trapezoidal projections serve the purpose of locking the shaft's sliding motion at any of the selected positions which are determined by the location of the said trapezoidal projections.

3 Claims, 9 Drawing Figures

PUSH-PULL-LOCK DEVICE FOR SLIDE SHAFT

BACKGROUND OF THE INVENTION

This invention relates to a device for locking the sliding (push and pull) motion of a sliding shaft. More particularly, the present invention relates to a device for locking the sliding motion of a shaft adapted to provide freely rotatable, pivotal engagement of two members or a shaft for disclosing or concealing an opening formed in the shaft fitting member.

The term "shaft" as used in the present specification means not only a shaft serving to bring two rotary members into a freely rotatable, pivotal engagement but also a slender plate-like piece adapted to slide along the shaft fitting member so as to disclose or conceal an opening formed in the shaft fitting member.

Heretofore, there have been suggested a number of devices for locking the sliding motion of a shaft. They are invariably complicated in mechanism and suffer a disadvantage that the shaft is completely withdrawn from the fitting member or it cannot be locked at a desired position during its sliding motion.

An object of this invention, therefore, is to provide a device which permits a shaft to be locked easily at a desired position and which is kept from being completely withdrawn from the shaft fitting member.

Another object of the present invention is to provide a device for locking the sliding motion of a shaft, which has a simple construction consisting only of a shaft and shaft guide pieces adapted to guide the sliding motion of the said shaft and which provides easy locking of the sliding motion of the shaft.

SUMMARY OF THE INVENTION

To attain the objects described above according to the present invention, there is provided a shaft locking device which comprises a plurality of hooked shaft guide pieces of an appropriately resilient plastic material disposed alternately along the opposite edges of a shaft fitting member confrontingly at staggered positions and a shaft having a raised strip with parallel edge faces each adapted to keep sliding contact with the horizontal face of the hooks of the shaft guide pieces on its side, one said edge face being provided with one sawtooth projection permitting the shaft to slide in the push direction and a plurality of trapezoidal projections for locking the shaft. The shaft is permitted to slide in the push direction but, in the pull direction, it obtains sliding motion over a fixed distance at the end of which it is locked by the sawtooth projection, with the result that the shaft is kept from being completely withdrawn from the guide pieces. The trapezoidal projections formed on the shaft permit the shaft to be locked and retained at any of selected positions. Because of such simple construction, the present invention provides ready locking of the shaft.

Other objects and other characteristic features of the present invention will become apparent from the description to be given in further detail with reference to the accompanying drawings.

DESCRIPTION OF PREFERRED EMBODIMENTS

Figure 1:
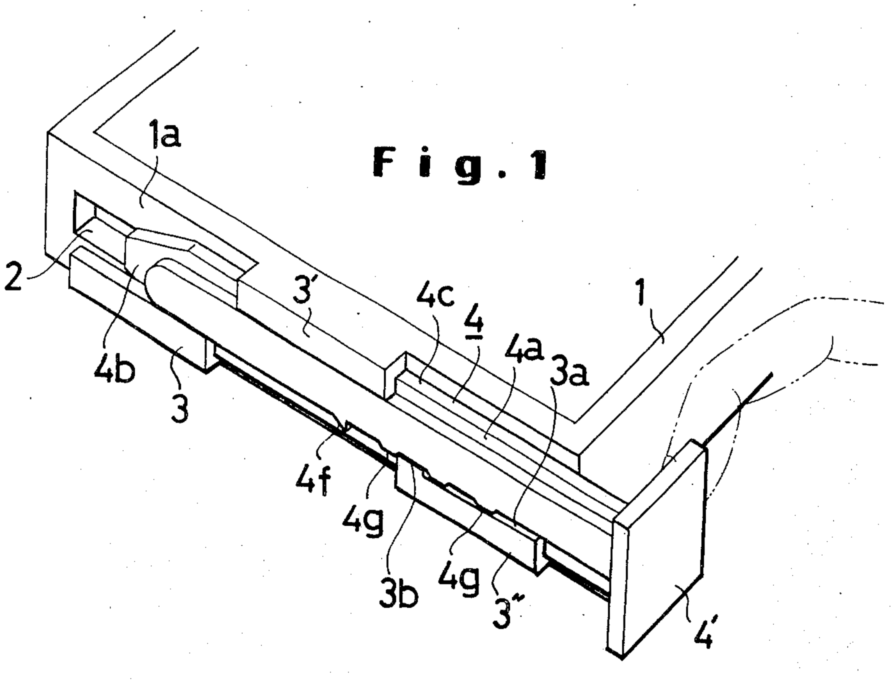
FIG. 1 is a perspective view of one preferred embodiment of the push-pull-lock device for slide shaft according to the present invention.

FIGS. 1–6 show the first preferred embodiment of this invention, in which the shaft serves to conceal or disclose an opening 2 perforated through a side member 1*a* of a box 1 forming a part of the shaft fitting member as the shaft slides along the shaft fitting member.

Referring to the drawings, on the side member 1*a* of the box 1 containing the opening 2, a plurality of hooked shaft guide pieces 3, 3′ and 3″ of an appropriately resilient plastic material are disposed alternately along the opposite edges of the side member 1*a* confrontingly at staggered positions. On at least one of these shaft guide pieces, namely on the shaft guide piece 3″ in the illustrated embodiment, a protuberance 3*b* is formed on a confronting edge face 3*a* of the hook of this guide piece 3″. A plastic shaft 4 is inserted in the space formed inside the plurality of hooked shaft guide pieces disposed confrontingly on the side member 1*a* of the box. In this particular preferred embodiment, the shaft 4 is formed of a slender plate-shaped member 4*a*. As the shaft 4 is slid along inside the guide pieces, the forward portion 4*b* of the shaft 4 discloses or conceals the opening 2 perforated through the said box 1. The upper and lower edges 4*c* and 4*d* of the slender plate-shaped member 4*a* are engaged freely slidably with the squarish grooves 3*c* formed between the hooks of the shaft guide pieces 3, 3′ and 3″ and the side member 1*a*. Further on this slender plate-shaped member 4*a*, a slender raised strip 4*e* having a smaller width than that of the plate-shaped member 4*a* is formed in the longitudinal direction to serve as a member for keeping sliding contact with the confronting edge faces 3*a* of the said hooked shaft guide pieces. On the lower edge face of the slender raised strip 4*e* which is exposed to sliding contact with the edge face 3*a* of the hook of the shaft guide piece 3″ and the protuberance 3*b* formed on the said edge face 3*a*, there are formed one sawtooth projection 4*f* which is permitted to slide over the said protuberance 3*b* in its motion in the push direction but is stopped because of collision into the said protuberance 3*b* in its motion in the pull direction and which therefore serves to prevent the shaft from being completely withdrawn from the shaft fitting member and a plurality of trapezoidal projections which can slide over the said protuberance 3*b* upon application of mild force and which therefore serve for mold locking of the shaft during its sliding motion. The forward end 4*b* of the shaft 4 is tapered to ensure smooth advance of the shaft through the space formed inside the shaft guide pieces 3, 3′ and 3″. At the rear end, the shaft 4 is provided with a finger piece 4′ intended as a catch for fingers to exert force needed to slide the shaft 4. This finger piece 4' may be formed by simply bending the rear end of the shaft at a right angle.

In order for the shaft 4 of such construction to be freely slidable engaged with the shaft fitting member, namely the shaft guide pieces 3, 3' and 3'' formed on the side member 1*a* of the box 1, one is only required to insert the upper and lower edges 4*c* and 4*d* into the corresponding squarish grooves 3*c* of the shaft guide pieces 3, 3' and 3'', with the forward end of the shaft 4 first, and push the shaft 4 in. In this case, the sawtooth projection 4*f* formed on the lower edge 4*e* of the shaft 4 slides over the protuberance 3*b* formed on the shaft guide piece 3'' and comes to rest in a freely slidable state as illustrated in FIGS. 1 and 6. After the shaft has been inserted in the shaft fitting member as described above, the said sawtooth projection 4*f* formed on the shaft, while the shaft 4 is slid back, collides into the protuberance 3*b* formed on the said shaft guide piece 3'' as shown in FIG. 6(B) so that the shaft 4 is not easily pulled completely out of the shaft fitting member. On the other hand, the said plurality of trapezoidal projections 4*g* formed at certain intervals on the shaft 4 are permitted to slide over the protuberance 3*b* formed on the said shaft guide piece 3'' when the shaft is slid under application of a mildly increased force.

Figure 6A:
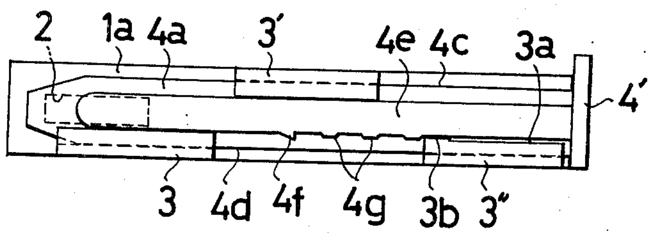
FIG. 6A and 6B are a front view illustrating the operation of the preferred embodiment of FIG. 1.
Figure 6B:
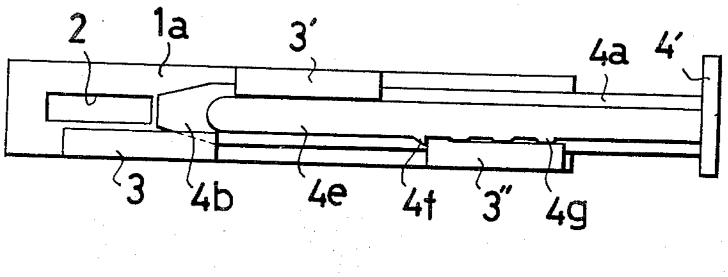
Figure 2:
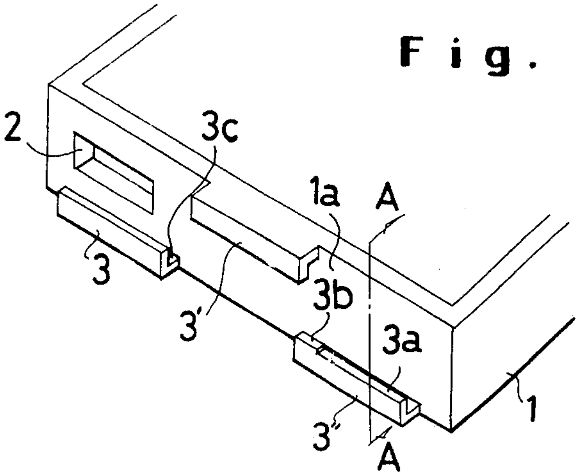
FIG. 2 is a perspective view of the preferred embodiment of FIG. 1, excluding the shaft.
Figure 4:
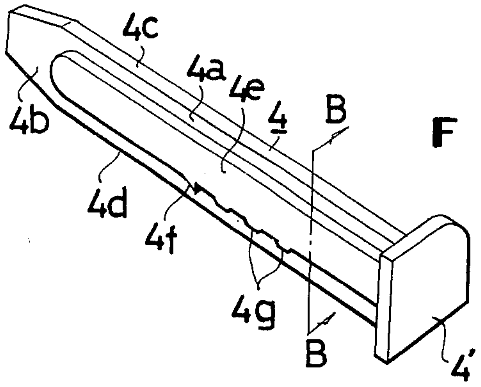
FIG. 4 is a perspective view of the shaft for use in the preferred embodiment of FIG. 1.
Figure 3:
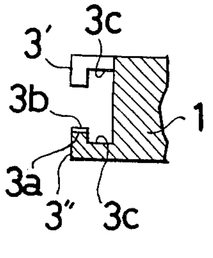
FIG. 3 is a cross section taken along the III—III line in the drawing of FIG. 2.
Figure 5:
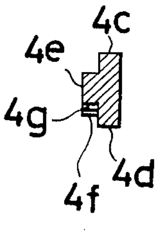
FIG. 5 is a cross section taken along the V—V line in the drawing of FIG. 4.

When the protuberance 3*b* and the trapezoidal projections 4*g* are formed at suitable positions and the shaft is slid in or out suitably, therefore, the base of one selected projection 4*g* is caught on the protuberance 3*b* and the shaft is consequently locked in a state concealing the opening 2 as shown in FIG. 6(A), a state disclosing the opening 2 as shown in FIG. 6(B) or a state partially disclosing the opening 2 as shown in FIG. 1.

Figure 7:
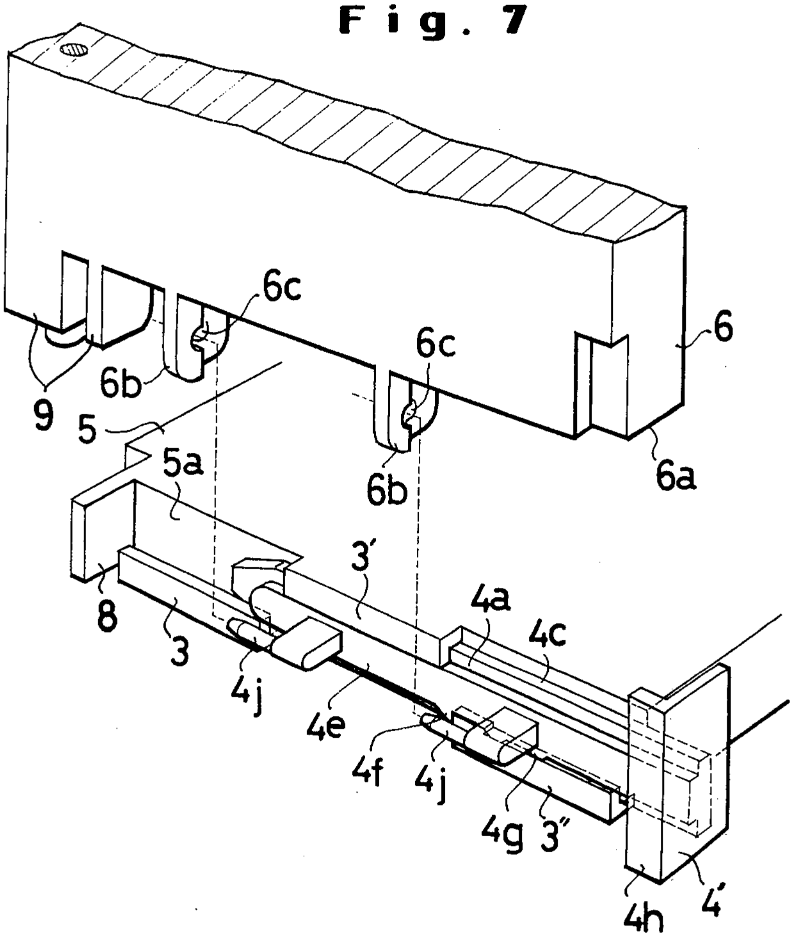
FIG. 7 is a perspective view of another embodiment of the push-pull-lock device for slide shaft according to the present invention.
Figure 8:
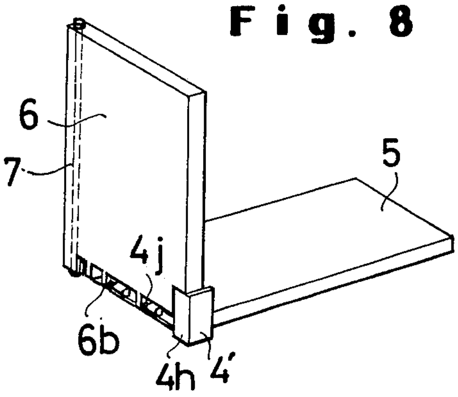
FIG. 8 is a perspective view of the preferred embodiment of FIG. 7 in its assembled state.

FIGS. 7 and 8 illustrate the second preferred embodiment of the present invention, wherein the shaft 4 is utilized as a shaft for allowing two mutually rotatable members 5, 6 to be brought into freely rotatable pivotal engagement.

Referring to the drawings, on the side face 5*a* of a member 5, shaft guide pieces 3, 3' and 3'' of an appropriately resilient plastic material are disposed alternately on the opposite edges confrontingly at staggered positions similarly to those used in the first preferred embodiment. At least one of these shaft guide pieces has a protuberance 3*b* formed on the edge face 3*a* thereof. The shaft 4 is inserted into the space formed inside the said guide pieces. The shaft 4 is provided, on the side thereof exposed to sliding contact with the said guide pieces, with one sawtooth projection 4*f* and two trapezoidal projections 4*g* for locking. On the outside of the slender raised strip 4*e* of the shaft, there are disposed a plurality of cantilever shafts 4*j*. On the side face 6*a* of the other member 6, there are formed as many arms 6*b* as the said cantilever shafts and the arms 6*b* each contains a hole 6*c* for inserting the said cantilever shaft 4*j*. Further, there are formed on the side face 6*a* of the member 6 two projections 9, 9 at a fixed interval and on the side face 5*a* of the member 5 a projection 8 to be inserted between the two projections 9, 9. In order for the two members 5, 6 to be joined freely rotatably, one is required to pull the shaft 4 until the sawtooth projection 4*f* is caught on the protuberance 3*b* of the shaft guide piece 3'' as the first step, then place the members 5, 6 in such position that the cantilever shaft 4*j* formed on the shaft coincide with the arms 6 formed on the member 5, insert the projection 8 between the two projections 9 and push the shaft 4 in so that the trapezoidal projections 4*g* slide over the protuberance 3*b* of the shaft guide piece 3'' and the cantilever shafts 4*j* go through the holes 6*c* in the arms 6*b*. Thus, the two members are joined freely rotatably. In this embodiment, when a retainer piece 4*h* having a width equalling the distance between the two projections 4*g* is attached to the finger piece 4' so as to run parallel to the shaft and when the shaft 4 is pushed in completely, the member 6 is immobilized at a right angle relative to the member 5 by the retainer piece 4*h* of the finger piece 4'. When the shaft 4 is pulled until only one of the trapezoidal projections 4*g* slides over the protuberance 3*b* of the shaft guide piece 3'', the retainer piece 4*h* of the finger piece 4' ceases to keep contact with the member 6 while the cantilever shafts 4*j* remain partly inserted in the holes 6*c* so that the two members 5, 6 become freely rotatable relative to each other. The two members 5, 6 are prevented from sliding from each other because the projection 8 is inserted and held between the two projections 9, 9. When the shaft is further pulled, the other trapezoidal projection 4*g* slides over the protuberance 3*b* of the shaft guide piece 3'' and the sawtooth projection 4*f* is caught on the protuberance 3*b* to terminate the sliding motion of the shaft. At this point, the cantilever shafts 4*j* come out of the holes 6*c*, with the result that the two members are separated from each other. By using one shaft as described above, the two members can be fixed fast to each other, joined in a freely rotatable state or separated from each other.

When the two members 5, 6 are fixed freely rotatably around an additional shaft 7, the cantilever shafts 4*j* are brought into immobilized engagement with the holes 6*c* of the arms 6*b* by merely pushing in the shaft completely. When the shaft 4 is pulled until the sawtooth projection 4*f* of the shaft 4 collides into the protuberance 3*b* of the shaft guide piece 3'', the cantilever shafts 4*j* come out of the holes 6*c*, rendering the two members freely rotatable around the shaft 7. For the purpose of freely rotatable union of the two members described above, it will suffice to form on the shaft 4 only one trapezoidal projection and use one cantilever shaft 4*j* and one arm 6*b* containing a hole 6*c*.

A box may be formed by joining similar members to the remaining side faces of the member 5 according to the method of union described above. The side members of the box may be separated from the member 5 or rendered rotatable by properly pulling the shafts inserted at the joints.

As explained above, the push-pull-lock device for the sliding shaft according to the present invention has an extremely simple construction which is composed of a plurality of hooked shaft guide pieces of an appropriately resilient plastic material disposed alternately along the upper and lower edges of a shaft fitting member confrontingly at staggered positions and a plastic shaft adapted to be slid along the space formed inside the confrontingly arranged hooked shaft guide pieces, the said plastic shaft having a raised strip with parallel edge faces each adapted to keep sliding contact with the horizontal face of the hooks of the shaft guide pieces on its side, one said edge face being provided with one sawtooth projection permitting the shaft to slide only in the push direction and a plurality of trapezoidal projections permitting the shaft to be mildly locked. The device, without requiring any other additional means, enables the shaft to be locked during its sliding motion at any of the selected positions determined by the location of the said trapezoidal projections and, at the same time, keeps the shaft from being completely pulled out of the shaft fitting member. Thus, the present invention can find extensive utility in a mechanism for adjusting the flow volume of a liquid or powder by disclosing or concealing an opening through the movement of a shaft, a mechanism for controlling photographic exposure, a mechanism for joining mutually rotating members in a freely rotatable state, etc. This invention is characterized by its great practical utility.

What is claimed is:

1. A plastic device having locking means thereon to control the sliding of a plate-shaped shaft element relative to a body on which it is mounted comprising a plate-shaped shaft member, a second body member having a plurality of hook-shaped shaft guide pieces mounted along a surface on which said plate-shaped shaft member is mounted, said body member being made of an appropriate resilient plastic material, said shaft guide pieces being disposed alternately along the margins of said body member in confronting but staggered positions, said hook-shaped shaft guide pieces including upright elements and at their terminal ends in spaced relation to said body member having lips also in confronting position and extending towards each other to form a channel, said plate-shaped shaft element having an entering end and a catch surface on its opposite end, said plate-shaped shaft element adapted to be inserted in and sealed along the surfaces formed by said body member and said hook-shaped elements mounted thereon which form the channel, said plate-shaped shaft element being provided along at least one of its margins with a sawtooth projection so positioned and shaped as to permit the shaft to be slidingly inserted between said shaft guide pieces and said body member with said tooth being temporarily distorted as it passes at least one of said guide shaft pieces and thereafter returning to its normal position to provide a lock to prevent inadvertent removal, and a second set of projections on the margin of said plate-shaped shaft member consisting of a plurality of trapezoidal projections for frictional interference with the hook-shaped guide piece elements to permit positionment of said plate-shaped shaft element in any desired predetermined position.

2. A plastic device of the type set forth in claim 1 wherein said catch element consists of an integral transversely arranged head portion on the end of said plate-shaped shaft element opposite the entering end to facilitate insertion of said shaft element between the guide pieces on a body member as well as its subsequent removal.

3. A device of the type claimed in claim 2 wherein said plate-shaped shaft element in cross-section is T-shaped and wherein the sawtooth projection as well as the plurality of trapezoidal projections which accomplish locking and positionment of the plate-shaped shaft element relative to the body member are provided on only one of the four margins of the T-shaped body member.

* * * * *